March 24, 1931.  K. C. D. HICKMAN  1,797,772
SPEEDOMETER
Filed Feb. 26, 1929
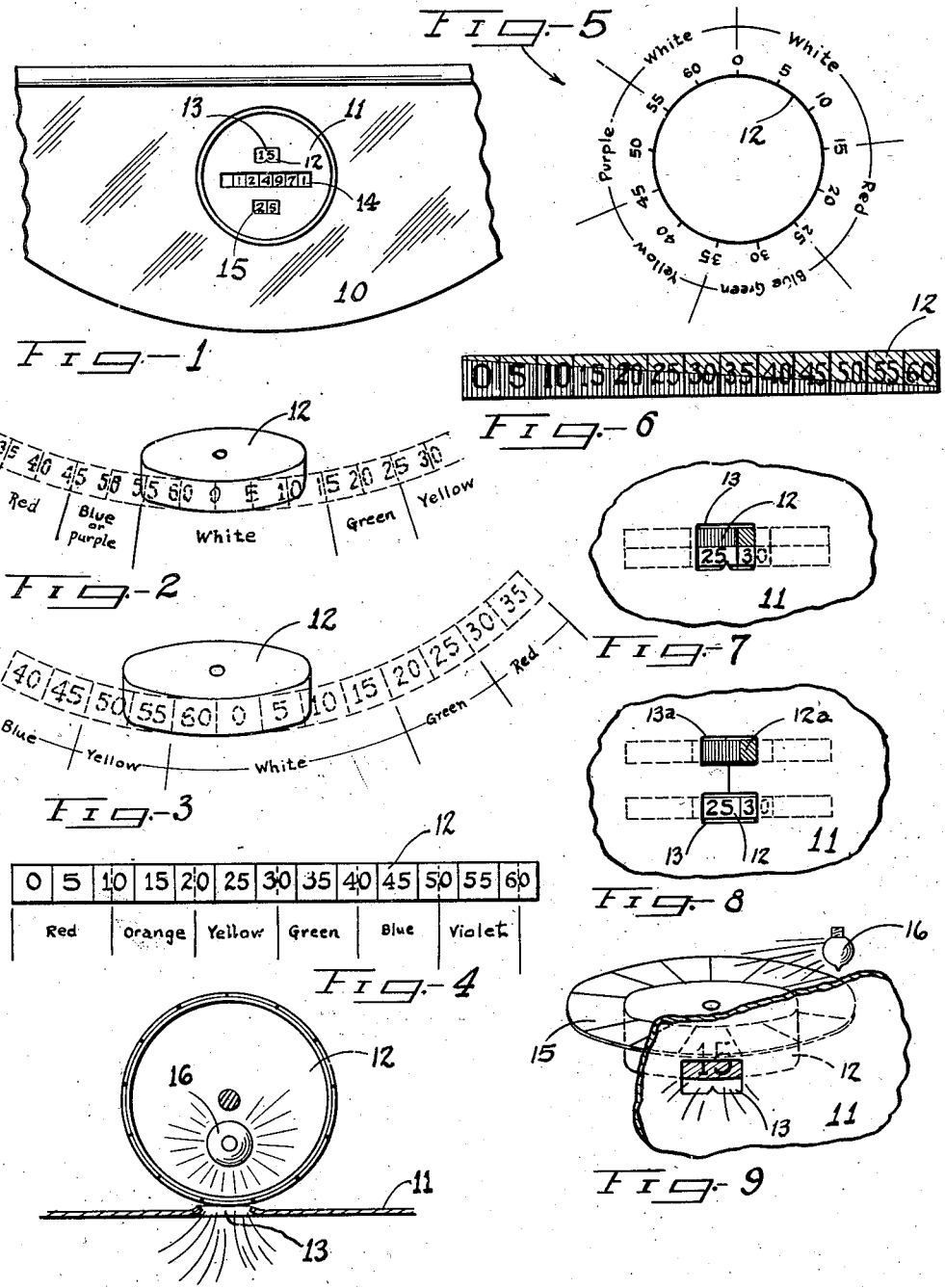
INVENTOR
KENNETH C. D. HICKMAN
BY D. Clyde Jones.
ATTORNEY Patented Mar. 24, 1931

1,797,772

UNITED STATES PATENT OFFICE

KENNETH C. D. HICKMAN, OF ROCHESTER, NEW YORK

SPEEDOMETER

Application filed February 26, 1929. Serial No. 342,810.

This invention relates to speedometers and more particularly to dials for use in connection with such devices.

The most prevalent type of speedometer is mounted on the dash of a motor vehicle and consists of a rotating drum engraved with figures indicating miles per hour, which drum rotates behind a window facing the operator of the motor vehicle. This window preferably presents to the operator only the figure or figures denoting the speed of the motor vehicle at that moment while the other figures are concealed until needed so that the eye is relieved of all effort of selection. Even the most carefully engraved dial in such a speedometer is not sufficiently legible in the short interval available to the operator at the high average speeds at which motor vehicles are now operated so that one of the main features of the present invention is the provision of a dial for speedometers which permits quicker perception of the speed indication with less concentration by the person observing this indication, than is at present possible.

Another feature of the invention includes the provision of an indicating member in a speedometer which permits reading of the speed indication by a person whose eyes are focused at infinity.

A further feature of the invention is the provision of a dial for a speedometer on which the speed indications are perceived more quickly than the interpretation of characters such as are now used on such devices.

These features and others will appear more fully from the detailed description and claims when taken with the drawings wherein Fig. 1 represents the dash of an automobile with a speedometer mounted thereon; Figs. 2 and 3 represent the rotating drum of such a speedometer with the indicating scale extended to indicate two possible color schemes; Fig. 4 represents a different color arrangement for the scale; Fig. 5 is a diagrammatic showing of still another color arrangement for the scale provided on the drum; Fig. 6 represents a still different modification in which two colors are arranged in the form of wedges whereby the speed indication by color is given by the proportion of the two colors visible at any given rate of speed; Fig. 7 is a front view of a speedometer showing a drum on which the speed indicating numerals and the color indications are separated, the color indications being present on the upper portion of the drum; Fig. 8 is a further modified form of the invention in which two drums actuated from the same driving source independently give speed indications; Fig. 9 which is a top view and Fig. 10 which is a front view represent still different arrangements in which the speed is indicated by the presence of differently colored illumination.

It is a property of human vision that whilst the eye is conscious of objects embraced in a very large angle of view, it is able to discern detail only in those objects in a very narrow angle. During reading, for instance, the glance travels from one small portion of a page to another and those portions not included in the glance, are, for the purposes of accurate interpretation, temporarily invisible.

The use of the eyes in the practical driving of an automobile may, however, be very different. The eyes are focussed generally at infinity and the observer, instead of glancing at each object in the field individually as it becomes a potential menace, keeps his glance comparatively stationary and is content to note the relative movement of many more or less blurred objects as they are imaged on the peripheral portions of his retinæ.

When the driver wishes to ascertain his speed by looking at the speedometer he has to glance away from the road, re-focus his eyes, cause the glance of the two eyes to converge, adapt them (in day-time) to a lower level of illumination, and then keep the glance fixed for nearly a second before the characters can be remembered. During this minimal time of a second, if he is traveling at 35 M. P. H. he will have come more than one hundred feet nearer a driver proceeding at the same speed in the opposite direction. It is common knowledge that a glance of one second's duration away from the road has been the cause of fatal accidents.

A speedometer serves at least two useful purposes. It indicates for the pleasure of the driver, his speed on the open road; and it lets him know whether he is within the legal limits. The latter is the most important function but unfortunately it is at moments when accidents are imminent and the information is most urgently required that the driver can least spare the time to look at his speedometer. Any device, therefore, which will enable the observer to read his speedometer without a direct glance or with a shorter direct glance will be a valuable improvement and will contribute to the public safety.

It is well known to those versed in the physiology of vision that color can be discriminated on peripheral regions of the retina which are quite incapable of deciphering form; furthermore, that color can be discriminated without the eyes being brought to a proper focus and without the period of presentation being as long as that needed for the interpretation of form. The eye does not have to be prepared to see color but does have to be prepared to see form such as characters so that color intrudes itself on our consciousness without effort while form has to be sought by concentrated effort. Besides the retina possesses peripheral consciousness of change of color even when the color was not perceived until the change occurred.

The present effort and time involved in determining the operating speed can best be appreciated from Fig. 1 which represents a portion of the dash 10 of a motor vehicle on which there is mounted a speedometer 11 of the well-known type. This speedometer is provided with a rotating drum 12 engraved with numerals in multiples of five which drum rotates back of a window 13 visible from the driver's seat. In addition the speedometer is equipped with means 14 to indicate the total mileage of the motor vehicle while an additional meter 15 indicates the trip mileage. The operator in determining the speed at which he is driving, in addition to changing the focus of his eyes from the road to the speedometer, must select the rotating drum from the indicating devices 14 and 15 and must observe this drum long enough to decipher the numeral visible through the window 13. In accordance with my invention I color or cause to appear colored the revolving indicating drum 12 in such a manner that an easily selected, distinctive color or simple combination of colors is presented to the driver or other observer at speeds comprised within certain useful ranges. In its simplest form the invention includes a drum 12 painted with different colors at different parts of its periphery which colors are superimposed on the usual speed indicating numbers. I prefer to arrange these colors as shown in Fig. 2 so that green indicates the legal rate of speed, yellow indicates that the driver should observe caution, and red indicates danger.

However, in the appreciation of colors there are many psychological factors, whereby some find that the most pleasing arrangement for juxtaposition of colors is provided by the natural sequence of colors which occur in the visible solar spectrum as shown in Fig. 4 while others prefer the more complex and impure colors which have come into vogue for clothing and upholstery. While my invention includes such colors and such juxtapositions of colors within its scope I may use violent contrasts in hue and saturation as shown in Fig. 3 because these contrasts are more readily perceived by the normal eye and therefore effect an excellent indication of speed. In this color scheme, red is reserved for a region on the drum beyond the legal limit, that is beyond twenty miles per hour.

In practice I have found it best not to present more than two colors at one time and at certain speed ranges I have found it advantageous to display only one color at a time as shown in Fig. 5 where the region from the negative side of zero (as far as can be seen through the window 13) up to the numeral of 15 miles per hour, I leave white or color ornamentally any shade which will adorn the interior of the vehicle. From 15 to 25 miles per hour I tint the drum bright red; from 25 to 35 a bluish green, from 35 to 45 yellow and from 45 to 55 purple and from 55 onward, the drum may be left white or embossed with any suitable danger warning.

In the modified arrangement shown in Fig. 6 a background of two opposing wedges of color such as red and green or yellow and violet is provided, such that at low speeds one color is visible and at high speeds the other, with intervening ranges showing varying widths of both colors. This speed arrangement has not been found as effective as the other arrangements previously described.

In the modification shown in Fig. 7 the colored regions, which may be of any choice or arrangement of colors, are placed on a portion of the drum separate from the region on which the numerals are represented. It will be understood that the band of colors may be on the upper portion of the drum as shown or on the lower portion thereof with the numerals appearing on the upper portion. As a further modification, shown in Fig. 8, a separate drum 12a visible through window 13a and actuated from the same source as the drum 12 may be provided with color areas, as in the arrangement previously described.

To some drivers the greatest value of the present invention will be experienced in night driving. It may, therefore, in certain instances be advisable to have the color effect inoperative during the day but effective at night. This result may be obtained by the arrangement shown in Figs. 1 and 10. In the arrangement shown in Fig. 9 the drum 12 is mounted to rotate behind a window 13. In this case, however, the margin of the drum is provided with a horizontal flange 15 formed of wedges of transparent color elements such that light from the lamp 16 or other source, passes through one or another of the wedges as the speed varies, to cause the drum 12 to appear illuminated by one or two colors as the case may be, depending on the position of the drum and flange 15. It will be understood that the flange 15 instead of being attached to the drum may be mounted in any desired manner to present the proper color wedges to illuminate the portion of the drum that is visible through the window 13.

In the modification shown in Fig. 10 the periphery of the drum may be formed of transparent colored elements arranged in any desired manner and a light 16 is mounted to illuminate the interior of the drum so that the various portions of the drum presented before the window 13 transmit differently colored lights.

It should be distinctly understood that my invention does not claim to give a direct reading of speed characters more quickly than bold letters of black on a white ground, or vice versa. My invention does, however, provide a more quickly read message which may at leisure be interpreted as speed in miles per hour. In actual use I have found that the driver soon becomes content to think of speed in terms of color and thereafter can make extraordinarily quick estimates of his rate.

A most casual inspection of the drum just described will reveal the speed much more accurately than the ten mile divisions would seem to permit. Thus, in the arrangement of Fig. 5, if only a trace of red can be seen the speed is about 10 M. P. H.; a field divided equally between white and red denotes 15 M. P. H.; an all red field means 20 M. P. H.; red and green 25 M. P. H. and so on. With a little practice finer estimates can be made. I have found a ten mile color interval convenient, but any other may be used within reasonable limits and the size of the observing aperture may be adjusted accordingly.

In addition to the foregoing illustrations, I may employ, with fewer colors or small intervals, areas of black and white. I may use white letters on the black areas, and black, white or colored letters on the colored areas. The colors of the letters and their background may be complementary or of similar hue but of different saturation and brilliance.

Furthermore, I may color the drum in five regions, white with black numbers, black with white numbers, pink with black numerals, blue-green with black or white numerals and yellow with white numerals. Whether I use pure saturated colors or dilute colors, or black numerals or white numerals depends on the luminosity I wish to obtain and the position in the car I may wish to affix the instrument.

Besides the previous arrangements, I may use a black drum and emboss thereon colored numerals in progressively contrasting hues.

I realize that the colors to be used and their arrangement are open to changes in fashion and are likewise open to changes complying with various laws and speed regulations, but I consider these various colors, included within my invention, except as otherwise specified in the appended claims.

What I claim is:

1. An indicator for a speedometer provided with a plurality of color areas and characters in superimposed relation both serving to give an independent reading of speed indication.

2. An indicator for a speedometer provided with characters to indicate the rate of speed, and colors superimposed on said characters to indicate different ranges of speed.

In witness whereof, I hereunto subscribe my name this 25th day of February A. D. 1929.

KENNETH C. D. HICKMAN.